(12) United States Patent
Joo et al.

(10) Patent No.: US 8,189,013 B2
(45) Date of Patent: May 29, 2012

(54) VIDEO SIGNAL PROCESSING DEVICE AND METHOD OF PROCESSING GRADATION

(75) Inventors: Mi-Young Joo, Suwon-si (KR); Jong-Ho Park, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 750 days.

(21) Appl. No.: 12/318,407

(22) Filed: Dec. 29, 2008

(65) Prior Publication Data

US 2009/0167957 A1    Jul. 2, 2009

(30) Foreign Application Priority Data

Dec. 31, 2007    (KR) .................... 10-2007-0141237

(51) Int. Cl.
*G09G 3/30* (2006.01)
*G09G 5/00* (2006.01)
*H04N 5/52* (2006.01)
*H04N 5/14* (2006.01)
*H04N 1/46* (2006.01)
*G03F 3/08* (2006.01)
*G06K 9/40* (2006.01)
*G06T 17/00* (2006.01)
*H04N 5/202* (2006.01)
*H04N 1/40* (2006.01)
*G06K 9/34* (2006.01)

(52) U.S. Cl. .......... 345/617; 345/581; 345/207; 345/77; 345/428; 348/254; 348/678; 348/672; 358/516; 358/518; 358/448; 358/522; 382/254; 382/274; 382/173

(58) Field of Classification Search ................... 345/426, 345/428, 581, 589, 606, 614, 690, 617–619, 345/207, 48, 63, 77, 84; 358/509, 516, 518, 358/448, 520–522; 348/254, 678, 671–672; 382/167–168, 254, 274, 276, 173
See application file for complete search history.

(56) References Cited

U.S. PATENT DOCUMENTS

2007/0091434 A1* 4/2007 Garner et al. ................. 359/459
(Continued)

FOREIGN PATENT DOCUMENTS

JP    2005-315956    11/2005
(Continued)

OTHER PUBLICATIONS

Korean Office Action issued in Applicant's corresponding 10-2007-0141237 dated Dec. 11, 2009 and Request for Entry of the Accompanying Office Action attached herewith.

(Continued)

*Primary Examiner* — Wesner Sajous
(74) *Attorney, Agent, or Firm* — Robert E. Bushnell, Esq.

(57) ABSTRACT

Disclosed is a video signal processing device and a method of processing gradation capable of improving the contrast ratio and the user satisfaction of a plasma display device. The video signal processing device includes a position detecting unit for detecting positions of pixels to be displayed in a frame, a sub region detecting unit for detecting a central region including a reference point formed of at least one pixel in the frame and sub regions surrounding the central region, and a compensating unit for differently compensating brightness of pixels positioned in the sub regions and brightness of pixels positioned in the central unit.

17 Claims, 8 Drawing Sheets

U.S. PATENT DOCUMENTS

| | | | |
|---|---|---|---|
| 2007/0177037 A1* | 8/2007 | Kurata | 348/241 |
| 2007/0208385 A1* | 9/2007 | Carroll et al. | 607/2 |
| 2007/0273686 A1* | 11/2007 | Watanabe et al. | 345/419 |
| 2007/0292045 A1* | 12/2007 | Akatsuka | 382/274 |
| 2011/0110567 A1* | 5/2011 | Jiang | 382/128 |

FOREIGN PATENT DOCUMENTS

| | | |
|---|---|---|
| KR | 10-2002-0014766 | 2/2002 |
| KR | 10-2003-0088540 | 11/2003 |
| KR | 1020030033754 A | 2/2005 |
| KR | 10-2006-0008777 | 1/2006 |
| KR | 10-2006-0091564 | 8/2006 |
| KR | 1020070044713 A | 4/2007 |
| KR | 1020080008632 A | 1/2008 |

OTHER PUBLICATIONS

Transmittal letter and Korean Office action dated May 22, 2009 in corresponding Korean Patent Application No. 2007-0141237.

* cited by examiner

VIDEO SIGNAL PROCESSING DEVICE AND METHOD OF PROCESSING GRADATION

CLAIM OF PRIORITY

This application makes reference to, incorporates the same herein, and claims all benefits accruing under 35 U.S.C. §119 from an application for VIDEO SIGNAL PROCESSING DEVICE AND METHOD OF PROCESSING GRADATION earlier filed in the Korean Intellectual Property Office on 31 Dec. 2007 and there duly assigned Serial No. 10-2007-0141237.

BACKGROUND OF THE INVENTION

1. Field of the Invention

The present invention relates to a video signal processing device and a method of processing gradation of brightness, and more particularly, to a video signal processing device capable of improving the contrast ratio and of improving the user satisfaction of a plasma display device, and to a method of processing gradations of brightness.

2. Discussion of the Related Art

Display devices are widely used as output device for delivering representations of video information to an audience, and the display devices may be broadcasting terminals as well as computer terminals. Recently, flat panel displays (FPD) such as liquid crystal displays (LCD), field emission displays (FED), and plasma display devices are rapidly becoming ubiquitous.

Among the various display devices, plasma display panels (PDP) have higher brightness and emission efficiency, and a wider view angle compared to the other FPDs. Therefore, the PDPs, used as large size display devices, are spotlighted as the display devices which are replacing contemporary cathode ray tubes (CRT).

A user who views the images displayed on a display device may have several view patterns. For example, since the user looks at the center of a screen of the display device, the user is satisfied when the brightness of the center of the screen is high. When the user views a moving image displayed on the display device, however, because the range of view of the user is narrower for the moving image compared to a still image, the user is insensitive to a fine difference in brightness. Here, when the user views the moving picture on the screen, the user looks at a moving object.

In the case of contemporary plasma display devices, however, since the brightness condition of the still image is commonly applied to the moving picture, even though the view pattern of the user varies with the still image and the moving picture, a gradation of the brightness that is most appropriate to the view pattern of the user cannot be displayed. Therefore, contemporary plasma display devices are unable to satisfy the viewing satisfaction of the user.

SUMMARY OF THE INVENTION

It is therefore an object of the present invention to provide an improved video signal processing device and a method.

It is another object to provide a video signal processing device and a method for processing gradations intrinsic to the video characteristics of each image displayed on a display device in order to assure the user's viewing satisfaction for both of the moving pictures and still images displayed on the display device.

It is yet another object to provide a video signal processing device and a method for processing gradations in each video image displayed in order to enhance the user's satisfaction with the display device.

It is still another object to provide a video signal processing device and a method for processing gradations in each video image displayed in order to improve the contrast ratio of the video images displayed by a display device.

In order to achieve the foregoing and other objects of the present invention, according to an aspect of the present invention, there is provided a video signal processing device that may be constructed with a position detecting unit for identifying the positions of pixels to be displayed within a frame, a sub region detecting unit for detecting a central region including a reference point formed from at least one pixel within the frame and the sub regions disposed to surround the central region, and a compensating unit for differently compensating for the brightness of pixels positioned in the sub regions and the brightness of pixels positioned in the central unit.

According to another aspect of the present invention, there is provided a gradation processing method that contemplates a division of a frame to be displayed into a central region 11 and a sub region that surrounds the central region, a determination of the compensation levels of the pixels of the frame so that the brightness of the central region is higher than the brightness of the sub regions, and the application of the determined brightness compensation levels to the video image output to be displayed to an audience on the screen of a display panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

These and/or other embodiments and features of the invention will become apparent and more readily appreciated from the following description of certain exemplary embodiments, taken in conjunction with accompanying drawings.

Figure 1:
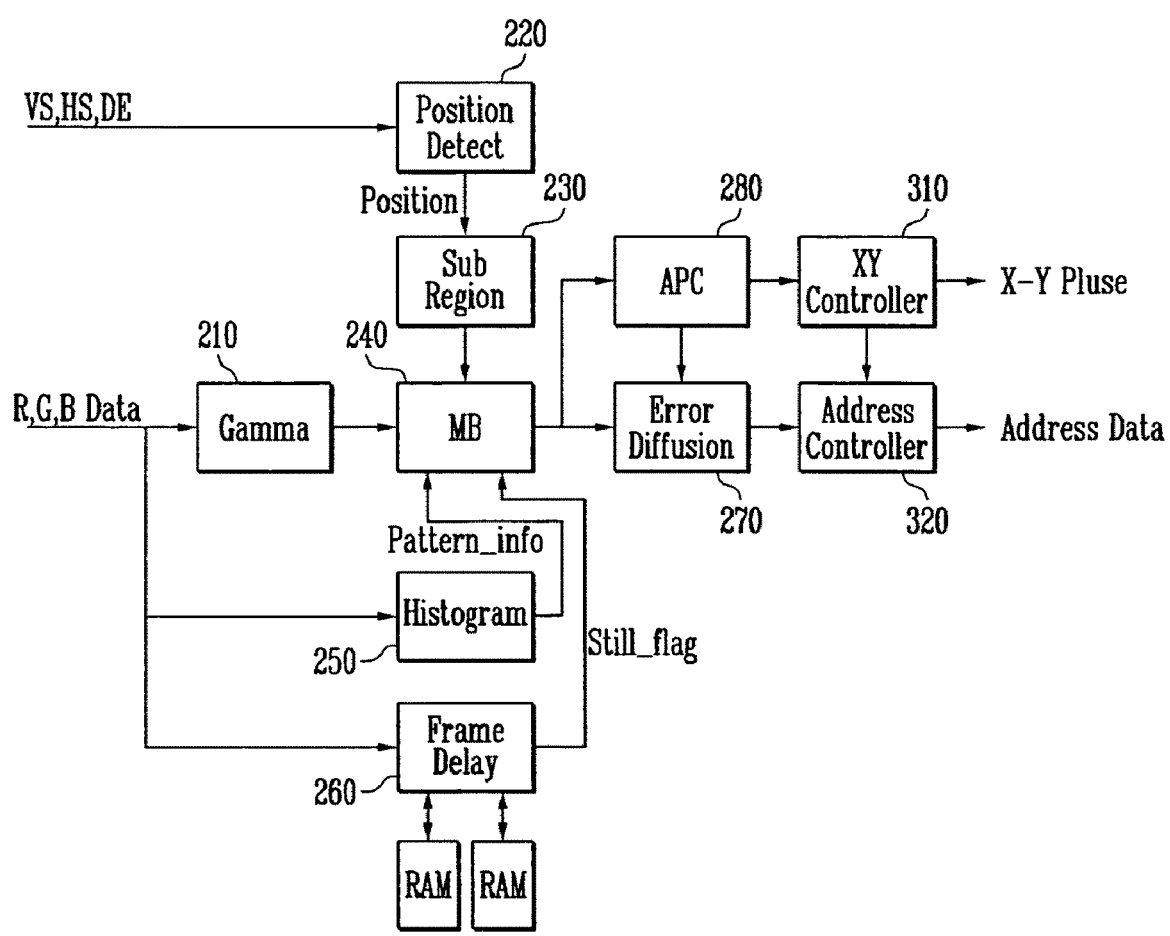
FIG. 1 is a block diagram illustrating a video signal processing device for a plasma display according to the present invention.

FIG. 1 is a block diagram illustrating the main parts of a video signal processing device for a plasma display according to an embodiment of the present invention.

The image signal processing device illustrated in FIG. 1 includes a previous gamma processing unit 210 for performing gamma processing on input video data R, G, and B data in accordance with predetermined processing, a position detecting unit 220 for detecting the positions of pixels to be displayed on a frame, a sub region detecting unit 230 for detecting the central region and the sub regions of the pixels based on the detection result of position detecting unit 220, a histogram analyzing unit 250 as a low brightness/simple pattern detecting unit for analyzing the kind of video data such as a low brightness frame and a simple pattern frame, a motion detecting unit 260 for analyzing the moving picture related items of the video data, a compensating unit 240 for differently compensating for pixels, respectively, in accordance with the kind of the video data such as a still image and a moving picture, a diffusion unit 270 for releasing the result adjusted by compensating unit 240, and an APC (automatic power control) unit 280 for determining the APC level of the compensated data.

In FIG. 1, an XY controller 310 for controlling driving signals to be supplied to the scan electrodes and the sustain electrodes of a plasma display panel (PDP) and an address controller 320 for controlling driving signals to be supplied to address electrodes, are illustrated together with the video signal processing device constructed as one embodiment of the present invention. For convenience sake, in FIG. 1, sub region detecting unit 230 independently illustrates position detecting unit 220. Sub region detecting unit 230 however may be included in position detecting unit 220.

Previous gamma processing unit 210 that is a gamma compensation processing device used for a common display device may be omitted.

Position detecting unit 220 receives a horizontal synchronizing signal H_sync and HS, a vertical synchronizing signal V_sync and VS, and a DE Data_Enable signal from the exterior to calculate the positions of pixels to be displayed on a frame or a screen in accordance with predetermined processing based on the received signals. Sub region detecting unit 230 distinguishes the central region using at least one of the pixels to be displayed as a reference point from at least one sub region that surrounds the central region.

Compensating unit 240 adjusts, in order to compensate for, the brightness gain of the pixels positioned in the sub regions to be lower than the brightness gain of the pixels positioned in the central region in accordance with the kind of the video data.

Histogram analyzing unit 250 determines whether the input video data R, G, and B data are in a low brightness frame or in a simple pattern frame. For example, histogram analyzing unit 250 determines the kind of the video data using a histogram. Here, the histogram converts the input R, G, and B data into an X-Y space where a Y component corresponds to the divided value of the R, G, and B data according to 0 to 255 bright levels (as an X component) and the histogram accumulates the Y component of the input R, G and B data within the frame in the X-Y space. Here, histogram analyzing unit 250 determines that the input video data R, G, and B data are in the low brightness frame when the value of Y component accumulated at 0 level (X component) is larger than values accumulated at any other bright levels (i.e., at 1 to 255 bright levels); and determines that the input video data R, G, and B data are in the simple pattern frame when the value of the Y component, among the values of the Y component accumulated at the entire levels (i.e., at 0-255 bright levels), accumulated at a certain level occupies a remarkable predetermined part. Histogram analyzing unit 250 provides compensating unit 240 with a pattern_info signal which identifies the pattern characteristic of the input frame.

Motion detecting unit 260 compares a previous frame stored in an additional storage device such as an RAM with a current frame to determine whether the current frame belongs to the moving picture and/or to distinguish the moving picture region in the current frame. Motion detecting unit 260 provides compensating unit 240 with a still flag signal which identifies whether the current frame belongs to moving images or still images.

Motion detecting unit 260 may have well-known various structures. For example, motion detecting unit 260 stores the R, G, and B video signals input in the previous frame in a frame memory RAM and compares the R, G, and B video signals input in the current frame with the stored R, G, and B video signals of the previous frame by pixels. On the other hand, motion detecting unit 260 averages a difference in the R, G, and B video signals by pixels to calculate an average video motion value and to determine motion using the same.

Diffusion unit 270 processes down to decimal places left in the compensation values of compensating unit 240 by predetermined processing such as rounding off, rounding down, and rounding up or prevents an image from rapidly changing on the boundary of the sub regions to release the compensation result. Diffusion unit 270 may be omitted.

Diffusion unit 270 may have various structures. For example, diffusion unit 270 may display an image of lower 4 bits by an error diffusion method or a dithering method. The error diffusion is a method of separating an image of the lower 4 bits and of diffusing the image into adjacent pixels to display the image of the lower 4 bits. The error diffusion method is described in detail with reference to Korean Patent Publication No. 2002-0014766.

APC unit 280 determines or controls the APC (automatic power control) level of the video data output from compensating unit 240. According to the present embodiment, the APC level of the compensated video data is determined. The APC level of the video data before compensation of compensating unit 240 however may be determined. APC unit 280 may have various well-known structures.

The video signal processing device illustrated in FIG. 1 may have different functions in accordance with the division method and the compensation processing of the sub region.

Figure 2A:
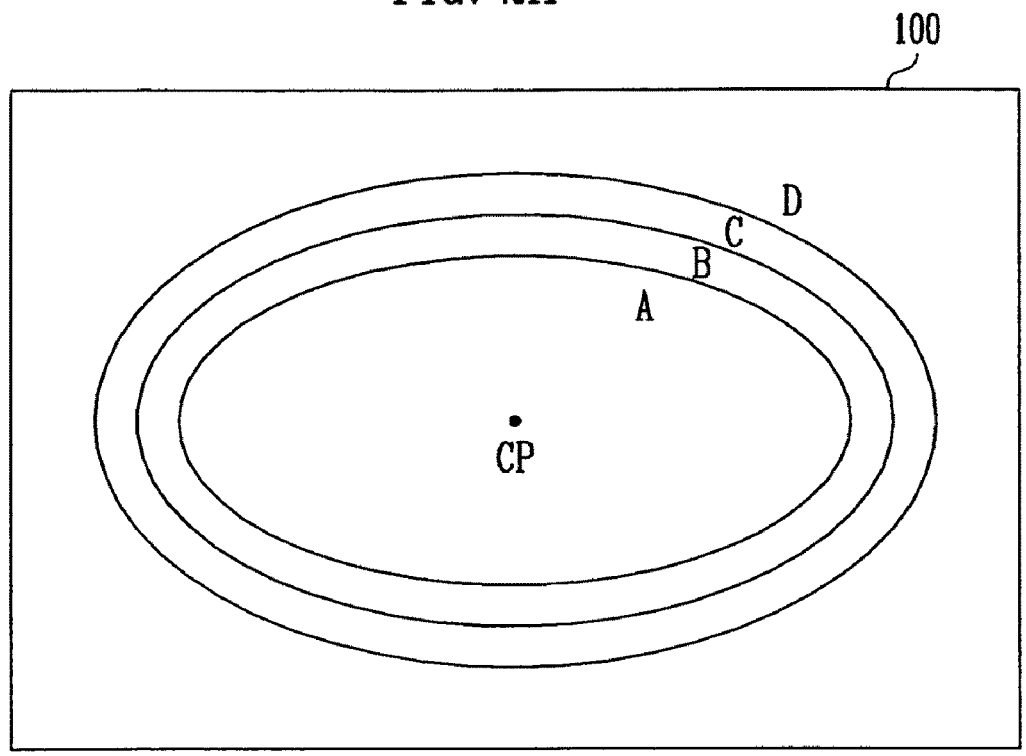
FIGS. 2A and 2B illustrate a method for gradation processing according to the present invention.

First, as illustrated in FIG. 2A, when a screen 100 is divided into ring-shaped regions to perform compensation, sub region detecting unit 230 divides one entire screen 100 into a central region A including a screen central point CP and a plurality of ring-shaped sub regions B, C, and D that surround the central region A. Compensating unit 240 adjusts, in order to compensate for, the brightness of pixels so that the brightness gain of sub regions close to the screen central point CP is higher than the brightness gain of sub regions remote from the screen central point CP.

Figure 2B:
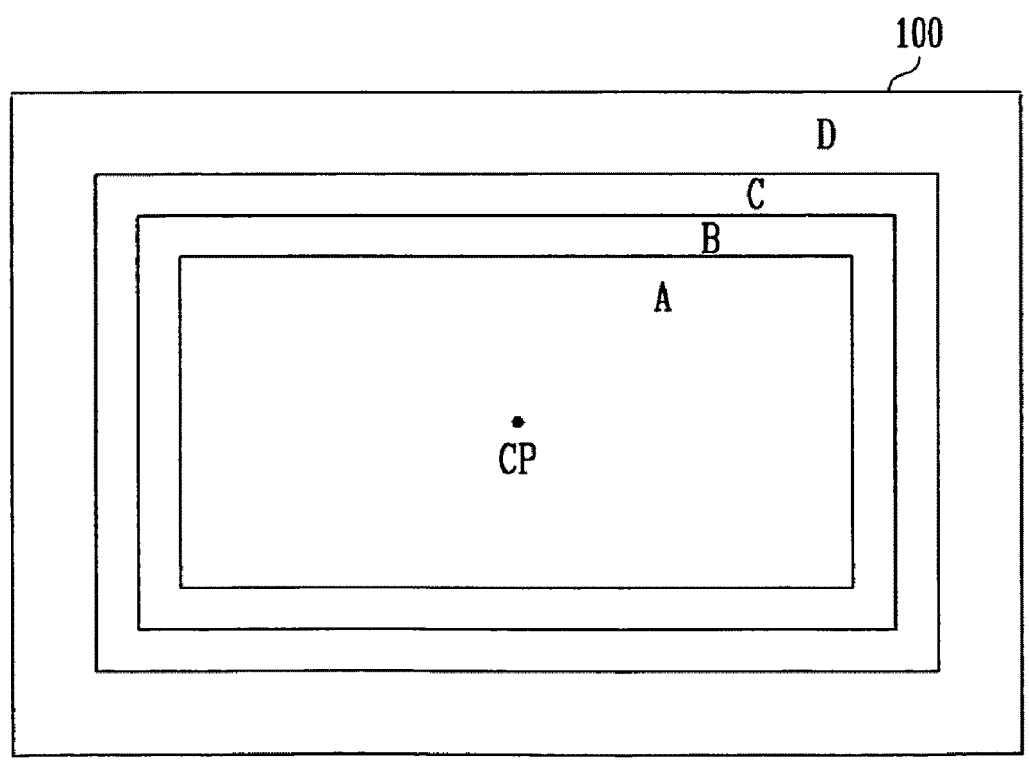
Figure 3:
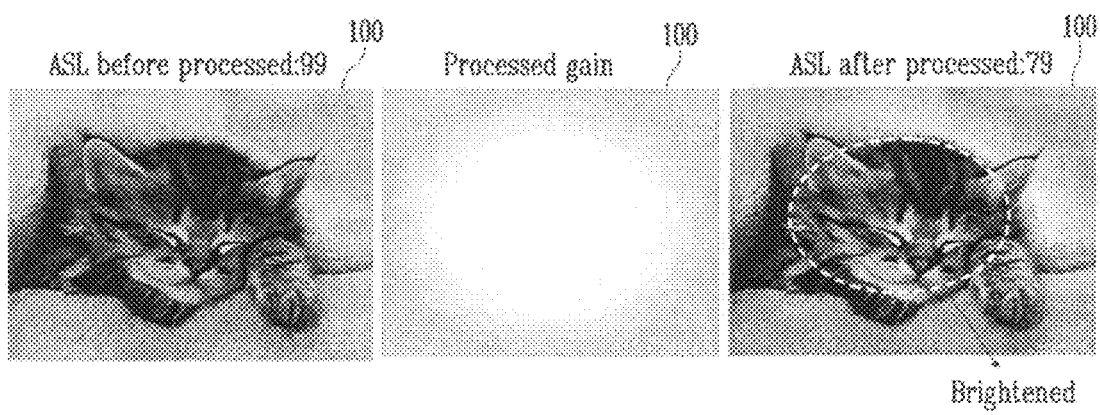
FIG. 3 shows an embodiment of the present invention illustrating the improved effect that is attainable with of the method of processing gradation according to the present invention.

That is, in the above-described method of compensating for the sub regions, different brightness gains are given to the sub regions B, C, and D. To be specific, a higher brightness gain is given as sub regions are closer to the screen central point CP and a lower brightness gain is given as sub regions are closer to the vicinity of the screen 100. In FIG. 2A, the central region A and the sub regions B, C, and D are elliptical and elliptical ring-shaped respectively. The central region A and the sub regions B, C, and D however may be circular and circular ring-shaped respectively or, as illustrated in FIG. 2B, square and square ring-shaped respectively. As described above, when frame data is divided into the central region and the sub regions and when the central region is adjusted by a high gain or when the sub regions are adjusted by a low gain, as illustrated in the graph (processed gain) imposed at the middle of FIG. 3, the brightness of the screen central region on which the view of the user is concentrated increases so that view satisfaction may be improved by comparing the left most graph (before brightness compensation) in FIG. 3 and the right most graph (after brightness compensation)in FIG. 3. In other words, the right most graph (after brightness compensation) in FIG. 3 has better view satisfaction than the left most graph (before brightness compensation) in FIG. 3. Here, the term 'ASL' in FIG. 3 indicates an average signal level of the image being displayed on the screen.

On the other hand, a rapid change in brightness in accordance with a difference in the brightness gain may be generated on the boundary between two sub regions. The step phenomenon of the brightness repeatedly appears and disappears in the vicinity of the central region in a band shape when an image in which brightness must not be adjusted and an image in which brightness must be adjusted are periodically repeated. Such a phenomenon seems to cause flicker in the visual presentation of images on the display screen. Therefore, in order to prevent the above-described step phenomenon and to avoid the creation of flicker, it is necessary to distinguish the time at which brightness compensation is applied from the time at which brightness compensation is not applied and to gradually apply a gain in brightness.

Figure 4A:
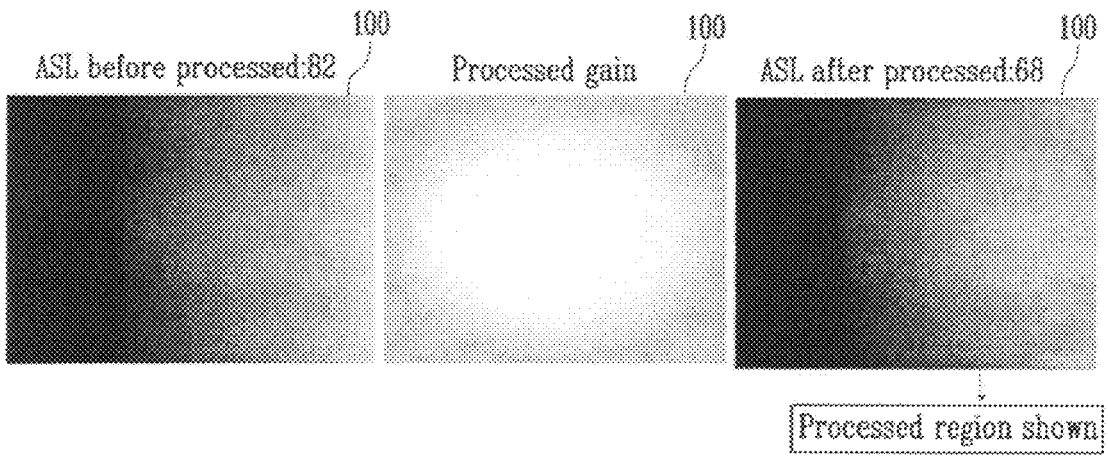
FIGS. 4A and 4B shows embodiments additionally describing the method for gradation processing according to the present invention.
Figure 4B:
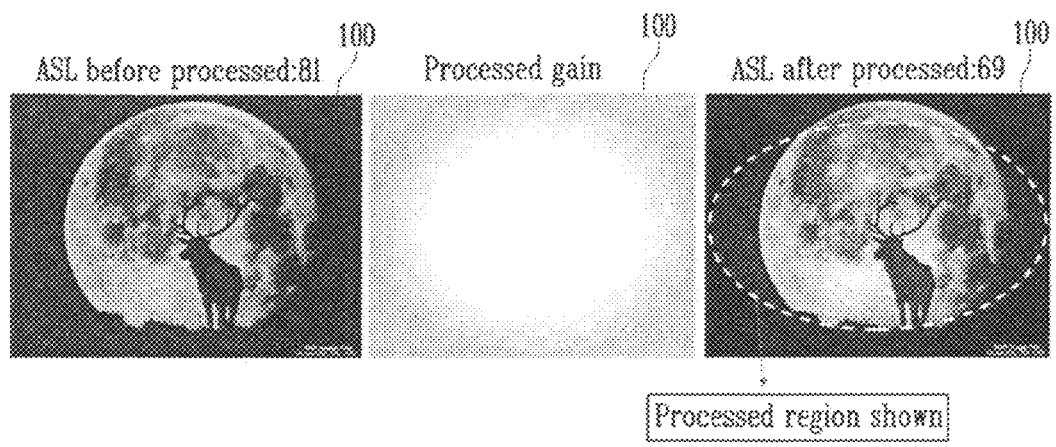

To be more specific, in the case of a low brightness image, when divided compensation is applied to the sub regions, as illustrated in FIG. 4A, the boundary between the sub regions may be sensed by the user. This is because the view of a user is more sensitive to a change in brightness in the low brightness image. In addition, in the case of the simple pattern image in which a single color region is wide, as is illustrated in FIG. 4B, the boundary between the sub regions can be remarkable. In the rightmost graphs of both FIGS. 4A and 4B clearly show step phenomenon after brightness compensation. Therefore, in the case of the low brightness frame or the simple pattern frame, the sub regions should not be adjusted. For example, in FIG. 4B, the leftmost graph shows a single color region indicating the dark sky and the dark ground images around the moon. After the leftmost graph is processed by the brightness adjustment as shown in the middle graph of FIG. 4B, an unnaturally brightened region appears undesirably in the leftmost graph and the brightened region distorts the single color region indicating the dark sky and the ground around the moon. In other words, the single color region no longer pure single color because the brightened region is shown in the single color region. This unnaturally brightened region is marked by the circle having a white broken periphery that appears to be unnatural and unrealistic in color and brightness to a human viewer of the display screen.

Figure 5:
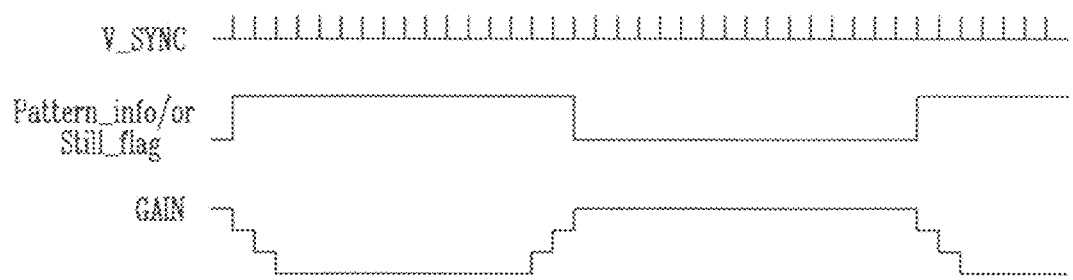
FIG. 5 illustrates waveforms of signals used for a method for gradation processing according to another embodiment of the present invention.

Therefore, histogram analyzing unit 250 determines whether the input video data is in the low brightness frame or in the simple pattern frame. Compensating unit 240 does not perform compensation when pixels to be displayed belong to a low brightness frame image or a simple pattern frame image determined by the result of analysis by histogram analyzing unit 250. For example, as illustrated in FIG. 5, compensating unit 240 may perform compensation by applying a step type gain only when a pattern_info or a still_flag signal received from histogram analyzing unit 250 is on.

On the other hand, in the case of the moving picture, in consideration of the user's viewing pattern, compensation by increasing the brightness of the central region may be performed. In the case of the still image that the user observes in detail, however, such compensation may reduce, or even deteriorate, the user's satisfaction with the quality of the images presented by the display panel. In such a viewpoint, the video signal processing device according to the present invention can perform compensation of increasing the brightness of the central region in the case of the moving picture. Therefore, compensating unit 240 receives information on whether the video data is a moving picture from motion detecting unit 260 and may not perform compensation of increasing the brightness of the central region when pixels to be displayed are determined by motion detecting unit 260 to not belong to the moving picture frame based on the received information. Here, whether the video data is a moving picture can be determined by whether the entirety of the pixels are completely stopped; or alternatively, can be determined by calculating whether the pixels move in order to determine whether the video data corresponds to a moving picture when the calculation result is larger than a predetermined reference value, and to determine whether the video data is a still image when the calculation result is not larger than the predetermined reference value. Detailed description of a motion detecting operation will be omitted since various methods such as a method of using a motion vector are well known.

On the other hand, the compensation method of increasing the brightness of the central region is changed to provide a method for more effectively compensating for the moving picture as follows.

Figure 6A:
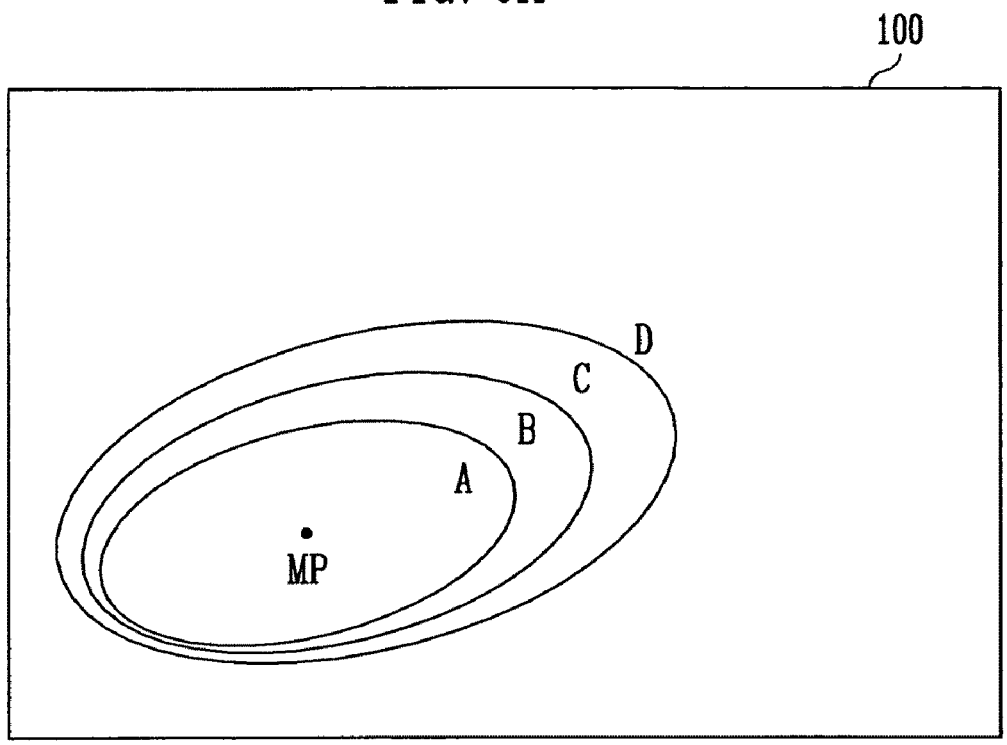
FIGS. 6A and 6B describe a method for gradation processing according to still another embodiment of the present invention.

Referring to FIG. 6A, in the case of the moving picture, the center of the view of the user is in the center of a moving object, rather than in the center of a screen 100. Therefore, motion detecting unit 260 obtains the central point (hereinafter, a reference point and MP) of moving objects and sub region detecting unit 230 divides one entire screen 100 into a central region A including the reference point MP and the plurality of ring-shaped sub regions B, C, and D that surround the central region A. Compensating unit 240 adjusts, in order to compensate for, the brightness of the sub regions B, C, and D by steps so that the brightness gain of the sub regions close to the reference point MP is larger and the brightness gain of the sub regions remote from the reference point MP is smaller.

In general, a PDP is configured to display a gradation in each cell. Because of continuous changes in load, the moving picture is changeably shown between bright and dark in a certain region. The moving picture generally consists of a plurality of still images, and the method of selecting the central region of the moving picture is substantially the same as that of the still images. For example, the central region of the moving picture can be set a higher brightness when being displayed in order to satisfy the conditions of a gradation and a gradation ratio. In detail, firstly, a reference gradation (e.g., a gradation level of 300) among 1 to 511 gradations and a reference gradation ratio (e.g., a gradation ratio of 60%) are set. Secondly, one of the predetermined divided regions is selected as a central region. The central region has a greater number of cells that contain the reference gradation in comparison to the other regions. Here, the number of the cells in the central region has to be equal to or greater than the number of cells defined by the reference gradation ratio (e.g., the gradation ratio of 60%). Thirdly, the central region is displayed to the viewer as brighter by increasing its brightness gain, thereby improving the contrast ratio of the screen 100.

Figure 6B:
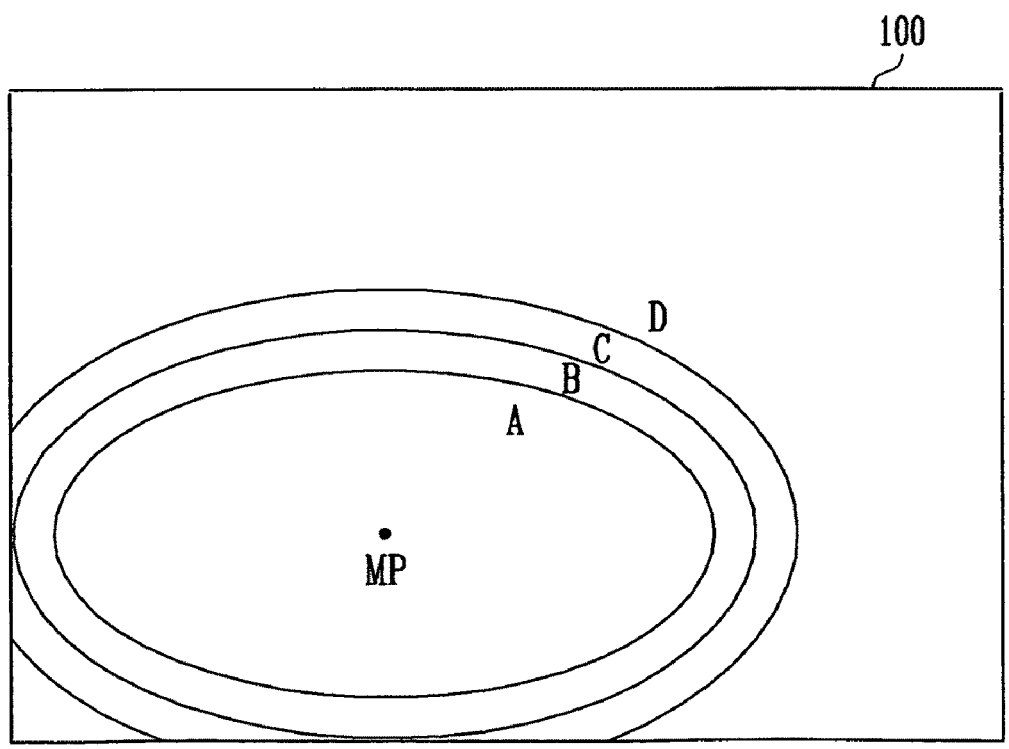

On the other hand, other shapes of the sub regions may be as illustrated in FIG. 6B. As illustrated in FIG. 6B, parts of ring-shaped sub regions may deviate from a screen region.

The gradation processing method according to the principles of the present embodiment is actually the same as the above-described compensation method of increasing the brightness gain of the screen central region, expect for that the screen central point (CP) is replaced by a motion central point (MP). In FIGS. 6A and 6B, central-region A is desired to contain the motion central point MP of the moving picture; sub-region B surrounds and is adjacent to central-region A; sub-region C surrounds and is immediately neighboring sub-region B; and sub-region D surrounds and is immediately neighboring sub-region C. Since the central point MP is not necessarily at the center point of the display screen 100, sub-regions B, C and D may deviate from the display screen 100 as shown in FIG. 6B.

A case in which a screen 100 is divided into a plurality of rectangular regions to perform compensation will be described with reference to FIGS. 1 and 7A to 7C.

Sub region detecting unit 230 divides one screen into a plurality of rectangular sub regions. At this time, compensating unit 240 may adopt (1) a method of remarkably compensating the brightness gain in those sub regions having high brightness levels or (2) a method of compensating for those sub regions having more motion by a higher brightness gain than the other sub regions having less motion.

For example, when the former method (1) is adopted, compensating unit 240 performs compensation in order to increase the brightness gain when the average brightness level of sub regions is higher than the other sub regions. When the latter method (2) is adopted, compensating unit 240 performs compensation by increasing the brightness gain of the pixels of the sub regions having more motion compared to other sub regions having less motion when the sub regions belong to the moving picture region.

In the former method (1), since the view is concentrated on the brighter part of the screen, the central region may be not made brighter than the vicinity to adjust, in order to compensate for, the brightness of the center of the panel and the bright part of the screen may be sensed to increase the brightness of the sensed bright part and to bring the bright part into relief so that the contrast ratio of the screen may be increased while the user views the screen 100.

Figure 7A:
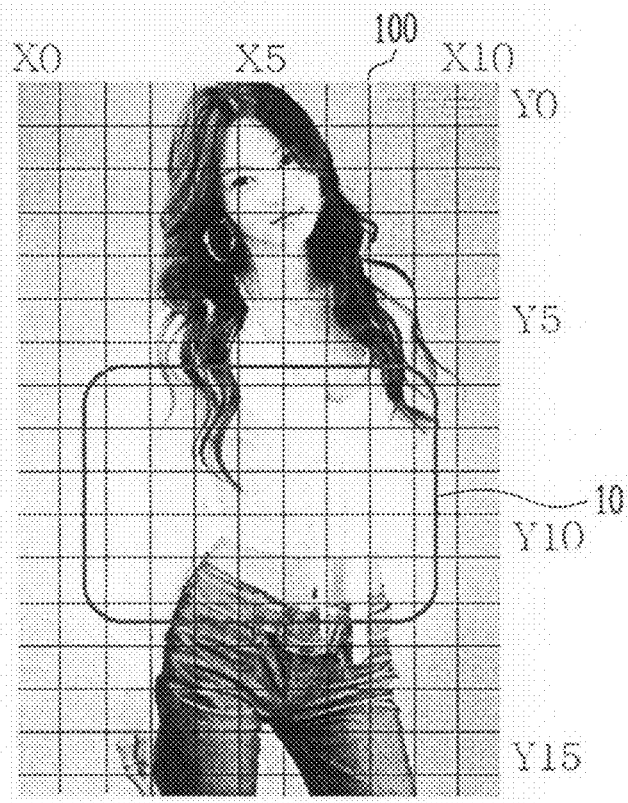
FIG. 7A is an embodiment illustrating the improved effect of a method for gradation processing according to still another embodiment of the present invention.

For example, as illustrated in FIG. 7A, after the screen 100 is divided, load is calculated by the divided screens in order to determine the part of the screen that should be processed to provide multi-brightness (MB). In the case of the embodiment of FIG. 7A, since X3 to X8 and Y8 to Y12 sub regions 10 are in the bright screen, sub regions 10 are adjusted by a higher brightness gain than the remaining regions so that the bright part is made brighter on the screen. Here, the MB processing refers either to partially applying a gain or to applying different gains in order to control brightness.

In the above case, sub-region detecting unit 230 or compensating unit 240 can include components for measuring the load rates of the sub-regions such as the automatic power control (APC) level and power consumption. On the other hand, in the above-described case, compensating unit 240 may perform compensation by the sub regions only on the frame determined by motion detecting unit 260 as the moving picture frame.

On the other hand, according to principles of the present embodiment, the sub regions are divided into rectangular regions of the same size. The sub regions however, also can be divided into rectangular regions having different sizes.

Figure 7B:
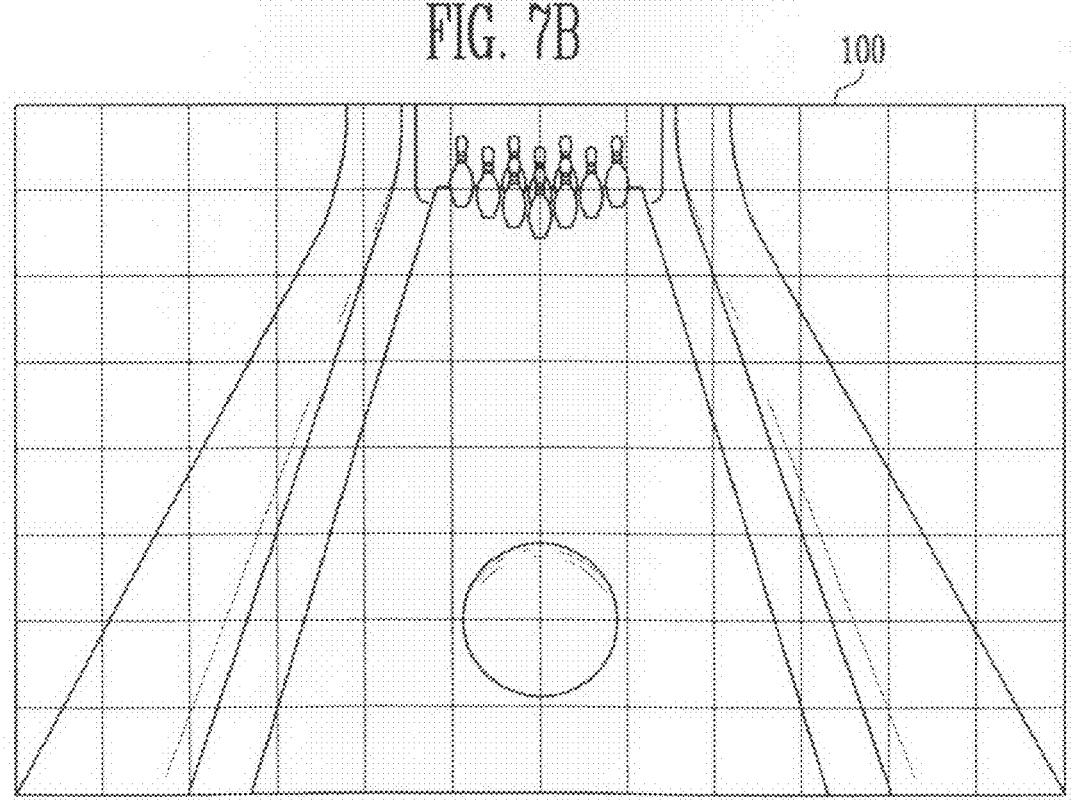
FIGS. 7B and 7C show a method for gradation processing according to still another embodiment of the present invention.
Figure 7C:
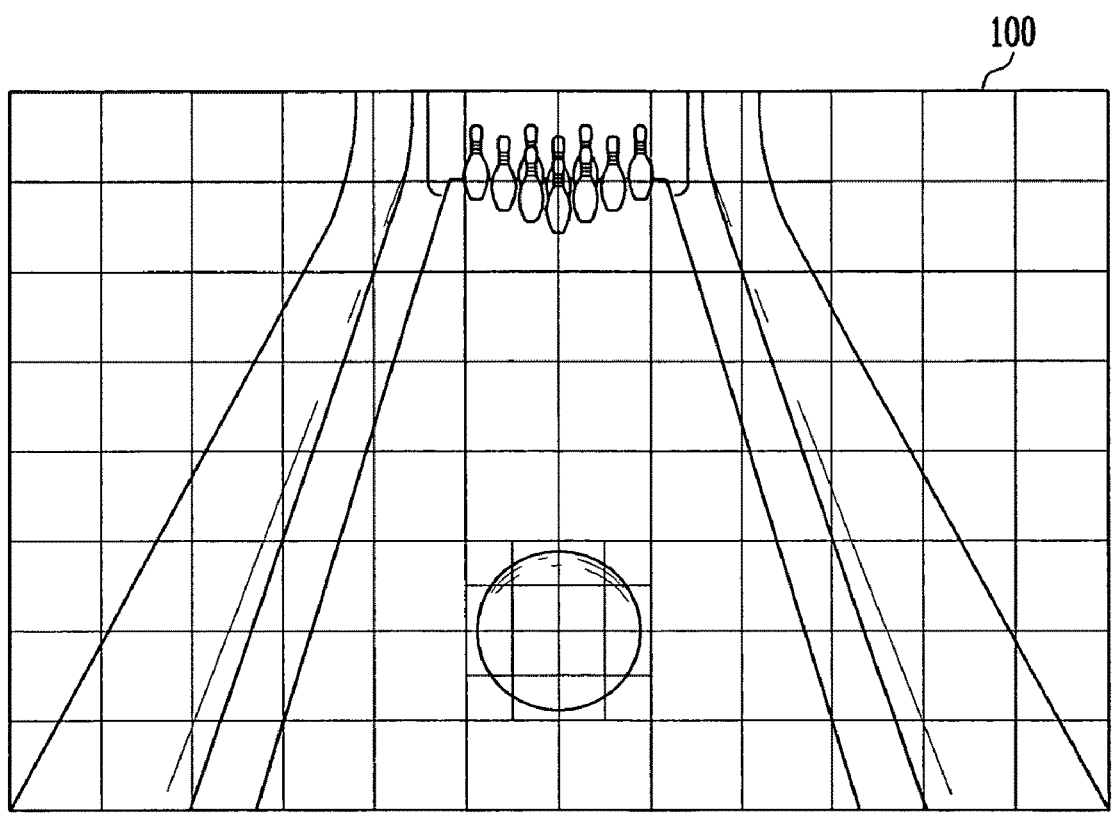

In addition, when the brightness compensation is determined to be different in accordance with the presence of the moving picture frame, that is, more particularly, when a boundary between a partial moving picture region and the remaining regions exists in each frame, as is illustrated in FIGS. 7B and 7C, a partial moving picture region can be divided into sub regions having sizes smaller than the sizes of the sub regions that divide the remaining regions. FIG. 7B illustrates that the partial moving picture region has been divided into sub regions of the same size. FIG. 7C illustrates that a region which presents an image of the balling ball while in motion is divided into sub regions of smaller sizes.

A description in any greater of a method of dividing the moving picture region in the entire screen 100 will be omitted since the method can be realized by well-known technologies such as a method of applying motion vector obtained by comparing a current screen with a previous screen.

On the other hand, when the rectangular sub regions are used, the brightness gain may be changed incrementally by steps rather than by rapidly changing the brightness gain on the boundary between the two sub regions.

In addition, when information on whether the video data is in the low brightness frame and/or the simple pattern frame is input, compensating unit 240 may not perform compensation when the pixels to be displayed are determined belong to the low brightness frame or to a simple pattern frame.

Here, the gradation processing method performed by the video signal processing device of FIG. 1 will be described. The gradation processing method as practiced according to the present embodiment includes such steps as (a) dividing a frame to be displayed into a central region and sub regions that surround the central region; (b) determining brightness compensation levels of the pixels of the frame so that the brightness of the central region will be larger than the brightness of the sub region; and (c) applying the determined brightness compensation levels to output the frame to a display panel.

Step (a) may be performed by sub region detecting unit 230 which performs a method of distinguishing the central region and the sub regions previously set in a process of designing sub region detecting unit 230 or alternatively, by combination of position detecting unit 220 and sub region detecting unit 230. Step (b) may be performed by compensating unit 240 in order to remarkably adjust, in order to compensate for, the brightness gain of the pixels which are positioned in the central region in comparison with the brightness gain of the pixels that are positioned in the sub regions. Step (c) is performed by supplying the video signal adjusted by compensating unit 240 to the PDP in order to drive the plasma display device.

In step (b), in the case of distinguishing the central region including a screen central point or a motion central point as a reference point, from the ring-shaped sub regions that surround the central region, either higher brightness compensation levels are given to the pixels positioned in the sub regions close to the reference point incrementally by steps or low brightness compensation levels are given to the pixels positioned in the sub regions remote from the reference point and close to the edges of the screen incrementally by steps.

On the other hand, in step (b), in the case of making a division into the rectangular sub regions of the same size, high brightness compensation levels are given to the pixels positioned in the sub regions that have higher brightness than the other sub regions, and low brightness compensation levels are given to the pixels positioned in the sub regions that have lower brightness than those sub regions having the high brightness.

On the other hand, in step (b), when the screen of one frame is divided into square sub regions and when a motion detecting unit determines whether the sub regions are in a moving picture, high brightness compensation levels are given to the pixels positioned in the sub regions which have large motion than is given to the other sub regions and low brightness compensation levels are given to those pixels positioned in the remaining sub regions which have small motion.

Here, in the case of the high brightness compensation levels, a large brightness gain (gain>1) is given and, in the case of the low brightness compensation levels, a small brightness gain (gain<1) is given. On the other hand, a basic brightness gain (gain=1) is applied to the high brightness compensation levels so that the current brightness is maintained at a current level and a small brightness gain (gain<1) is applied to the low brightness compensation levels. On the other hand, a basic brightness gain (gain=1) is applied to the low brightness compensation levels so that the current brightness is maintained and a large brightness gain (gain>1) is applied to the high brightness compensation levels so that the brightness increases to a higher level.

On the other hand, in the case of a low brightness frame or a simple pattern frame, when the gradation processing method according to the principles of the present invention is applied, picture quality can deteriorate. Therefore, in the gradation processing method, before performing the step (a), a determination may be made of whether a frame to be displayed is a low brightness frame and/or a simple pattern frame, as a further included step. In this case, when the frame to be displayed is either a low brightness frame and/or the simple pattern frame, a video signal processing device constructed as an embodiment of the principles of the present invention may directly transmit the frame output from previous gamma compensating unit 210 to the plasma display device without applying steps (a) to (c).

On the other hand, in the gradation processing method according to the principles of the present invention, when compensation is performed on the sub regions only for moving picture frames, a step of determining whether the frame is a moving picture frame can be further included before performance of step (a). In this case, when the frame to be displayed is determined to not be a moving picture frame, the video signal processing device that performs the gradation processing method may directly transmit the frame output from the previous gamma compensating unit 210 to the plasma display panel without applying the steps (a) to (c).

Figure 8:
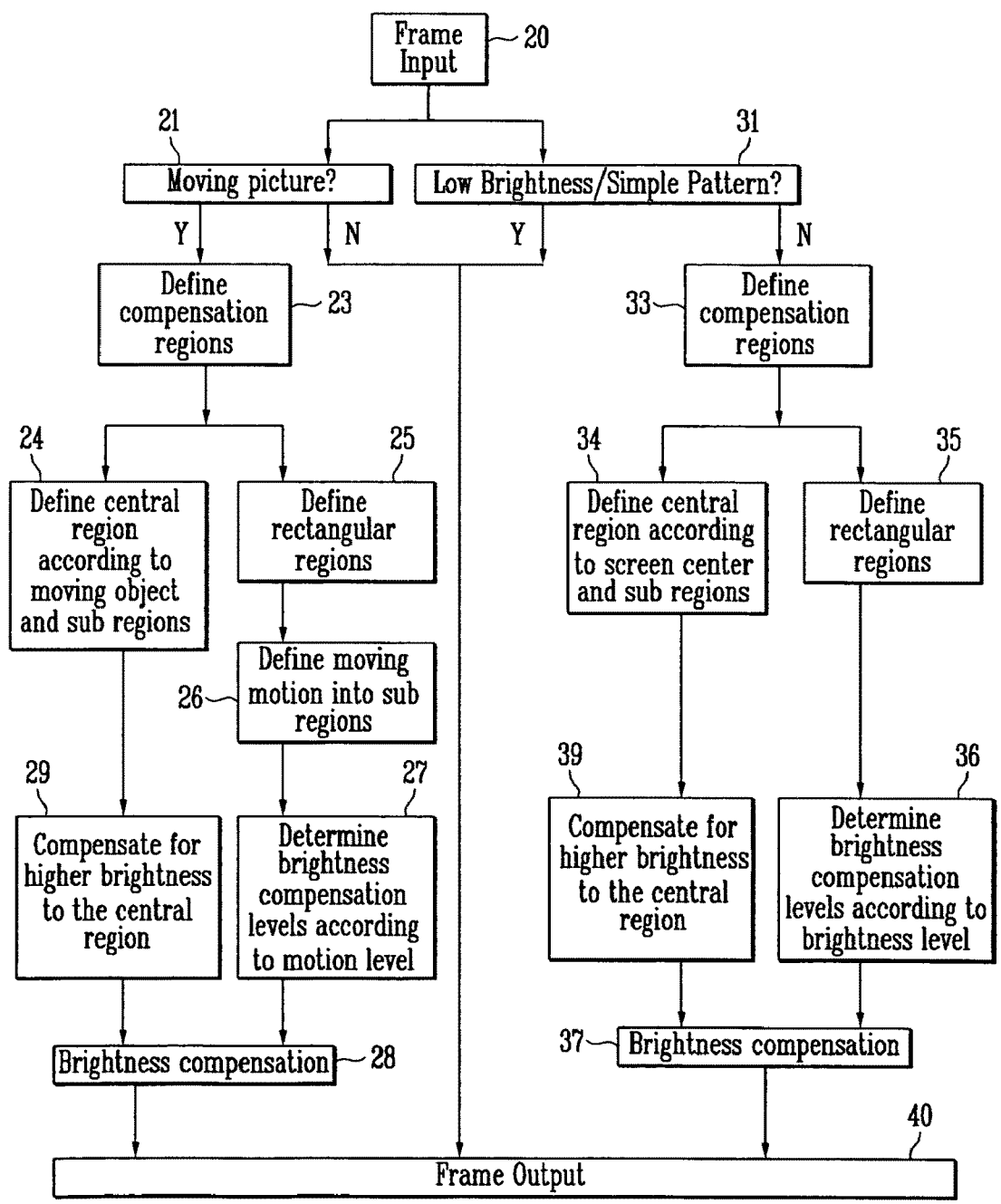
FIG. 8 shows a completed flow chart for gradation process according to the principle of the present invention.

FIG. 8 shows a completed flow chart of gradation process which may be performed in order to practice the principles of the present invention.

At step 20, a frame is input into the display device. The input frame is processed by histogram analyzing unit 250 and motion detecting unit 260 in order to determine whether the input frame corresponds to a moving picture or to lower brightness/simple pattern picture at steps 21 and 31.

When the frame corresponds to a non-moving picture (i.e., a video image of a still picture) and/or the lower brightness/simple pattern picture, the frame is directly output at step 40.

When the input frame corresponds to a moving picture, at step 23, sub region detecting unit 230 divides the entire screen 100 of the display device into several predetermined compensation regions. There are two possible methods of this division: at step 24, sub region detecting unit 230 may divide the entire screen of the display device into a central region according to the center point (a reference point) for making the moving object and into several sub regions surrounding the central region; and sub region detecting unit 230 may alternately divide the entire screen 100 of the display device into a plurality of rectangular sub regions as is indicated at step 25. At step 26, sub-region detecting unit 230 may further divide the rectangular sub regions corresponding to large motion into sub regions having smaller sizes. At step 29, higher brightness compensation levels are given to those pixels positioned in the sub regions close to the reference point by steps and lower brightness compensation levels are given to those pixels positioned in the sub regions remote from the reference point and close to the edges of the screen by steps. At step 27, compensating unit 240 determines the brightness compensation for each of the rectangular sub regions and those sub regions having smaller sizes according to the motion level to which each of rectangular sub regions and those sub regions having smaller size are determined to correspond. In other words, higher brightness compensation levels are given to the pixels positioned in the sub regions which have large motion than to the other sub regions, and lower brightness compensation levels are given to the pixels positioned in the remaining sub regions which are determined to have smaller motion. At step 28, compensating unit 240 adjusts, in order to compensate for, the brightness according to the determined brightness compensation levels for the corresponding pixels. Then, the compensated frame is finally output at step 40 for visual display by the screen 100 of the display device.

At step 33, when the input frame is determined not to correspond a low brightness/simple pattern, sub region detecting unit 230 divides the entire screen 100 of the display device into several predetermined compensation regions. There are two possible methods for performing this division: at step 34, sub region detecting unit 230 may divide the entire screen of the display device into a central region containing the center point (a reference point) of the screen and the several sub regions surrounding the central region; and sub region detecting unit 230 may alternately divide the entire screen of the display device into a plurality of rectangular regions as shown at step 35. At step 39, higher brightness compensation levels are given to those pixels positioned in the sub regions close to the reference point incrementally in steps or low brightness compensation levels may be given to the pixels positioned in the sub regions remote from the reference point and close to the edges of the screen by steps. At step 36, compensating unit 240 determines the brightness compensation levels for each of the sub regions according to the brightness level to which each of these sub regions corresponds. In other words, higher brightness compensation levels are given to the pixels positioned in the sub regions having higher brightness than the other sub regions and lower brightness compensation levels are given to the pixels positioned in these sub regions having lower brightness than the sub regions having the higher brightness. At step 37, compensating unit 240 adjusts and compensates the brightness according to the determined brightness compensation levels to the corresponding pixels. Then, the compensated frame is finally output at step 40.

When the video signal processing device and the gradation processing method are performed according to the principles of the present invention, the contrast visually perceived by the user of the display device is improved. As a result, the satisfaction of the user who uses the display device may be maximized.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A video signal processing device, comprising:
   a position detecting unit disposed to detect positions of pixels to be displayed in a frame;
   a sub region detecting unit disposed to detect a central region including a reference point formed from at least one pixel in the frame and sub regions surrounding the central region; and
   a compensating unit controlling brightness of pixels positioned in the sub regions to be less than brightness of pixels positioned in the central region, by adjusting brightness of the central region and the sub regions.

2. The video signal processing device as claimed in claim 1, in which the position detecting unit comprises the sub region detecting unit as a partial structure or a partial function.

3. The video signal processing device as claimed in claim 2, in which the reference point is a central point of a screen displayed as the frame.

4. The video signal processing device as claimed in claim 1, in which the reference point is a central point of a moving picture region of the screen.

5. The video signal processing device as claimed in claim 4, further comprising a motion detecting unit for determining whether the frame corresponds to a moving picture, in which the compensating unit adjusts brightness of pixels positioned in the central region by a higher brightness level than brightness of pixels positioned in the sub regions when the frame is in a moving picture.

6. The video signal processing device as claimed in claim 1, further comprising a histogram analyzing unit for determining whether the frame is a low brightness frame or a simple pattern frame, in which the compensating unit does not adjust brightness of pixels included in the frame when the frame is the low brightness frame or the simple pattern frame, with the low brightness frame being a frame in which a value of Y component accumulated at 0 level is larger than values accumulated at an other bright levels with the simple pattern frame being a frame in which a value of the Y component accumulated at a predetermined level occupies a predetermined portion among values of the Y component accumulated at an entire bright levels.

7. A gradation processing method, comprising:
   a first step for dividing a frame to be displayed into a central region and sub regions that are disposed surrounding the central region;
   a second step for determining brightness compensation levels of pixels of the frame so that a brightness of the central region is greater than a brightness of the sub regions; and
   a third step for applying the determined brightness compensation levels to output the frame to a display panel.

8. The method of claim 7, in which, in the first step, the central region is divided by using, as a reference point, at least one of the pixels disposed at a center of a screen where the frame is displayed, and the sub regions are divided into a plurality of ring-shaped sub regions that surround the central region.

9. The method of claim 8, in which, in the second step, greater brightness compensation levels are given to sub regions disposed closer to the central region and lesser brightness compensation levels are given to sub regions disposed farther from the central region.

10. The method of claim 7, in which, in the first step, the central region is divided by using, as a reference point, at least one of the pixels disposed at a center of a moving picture region of a screen where the frame is displayed, and the sub regions are divided into a plurality of ring-shaped sub regions that surround the central region.

11. The method of claim 10, in which, in the second step, greater brightness compensation levels are given to the central region and lesser brightness compensation levels are given to the sub region.

12. The method of claim 10, in which, in the second step, greater brightness compensation levels are given to sub regions having high brightness among the sub regions and lesser brightness compensation levels are given to sub regions having low brightness.

13. The method as claimed in claim 7, further comprising:
    determining whether the frame is a moving picture frame; and
    when the frame is not a moving picture frame, directly outputting the frame without applying the first step, second step and the third step.

14. The method of claim 7, further comprising:
    determining whether the frame is one of a low brightness frame and a simple pattern frame, with the low brightness frame being a frame in which a value of Y component accumulated at 0 level is larger than values accumulated at any other bright levels, with the simple pattern frame being a frame in which a value of the Y component accumulated at a predetermined level occupies a predetermined portion among values of the Y component accumulated at an entire bright levels; and
    when the frame is one of a low brightness frame and a simple pattern frame, directly outputting the frame without applying the first step, second step and the third step.

15. The method of claim 7, in which the central region is a region where pixels having large motion are positioned among pixels of the frame,
    the sub regions are remaining regions excluding the central region, and
    in the second step, higher brightness compensation levels are given to the central region than to the sub regions.

16. A gradation processing method, comprising:
    inputting a frame into a video signal processing device;
    determining, by a histogram analyzing unit of the video signal processing device and a motion detecting unit of the video signal processing device, whether an input frame corresponds to one of a still picture, a lower brightness and a simple pattern picture, with the low brightness frame being a frame in which a value of Y component accumulated at 0 level is larger than values accumulated at any other bright levels, with the simple pattern frame being a frame in which a value of the Y component accumulated at a predetermined level occupies a predetermined portion among values of the Y component accumulated at an entire bright levels;
    when the frame corresponds to one of the still picture, the lower brightness and the simple pattern picture, directly outputting the input frame;
    when the input frame corresponds to a moving picture, dividing, at a sub region detecting unit of the video signal processing device, an entire input frame into a predetermined number of regions, determining, at a compensating unit of the video signal process device, a brightness compensation for each of the predetermined number of regions in accordance with a motion level of each of the predetermined number of regions, compensating for, at the compensating unit, the determined brightness compensation for each of the predetermined number of regions, and outputting the compensated frame; and when the input frame does not correspond one of a low brightness and simple pattern, dividing, at the sub region detecting unit, the entire input frame into the predetermined number of regions, determining, at the compensating unit, the brightness compensation for each of the predetermined number of regions in accordance with a brightness level of each of the predetermined number of regions, compensating for, at the compensating unit, the determined brightness compensation for each of the predetermined number of regions, and outputting the compensated frame.

17. The gradation processing method of claim 16, when the input frame corresponds to the moving picture and the predetermined regions are rectangular sub regions, further comprising:

dividing, at the sub region detecting unit, rectangular regions corresponding to large motions into rectangular regions having a smaller size compared to that of the rectangular regions.

* * * * *